US010690882B2

(12) United States Patent
Nakamura

(10) Patent No.: US 10,690,882 B2
(45) Date of Patent: Jun. 23, 2020

(54) WIDE-ANGLE OPTICAL SYSTEM, LENS UNIT, AND IMAGING APPARATUS

(71) Applicant: Konica Minolta, Inc., Tokyo (JP)

(72) Inventor: Kentarou Nakamura, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 127 days.

(21) Appl. No.: 16/087,498

(22) PCT Filed: Mar. 24, 2017

(86) PCT No.: PCT/JP2017/012180
§ 371 (c)(1),
(2) Date: Sep. 21, 2018

(87) PCT Pub. No.: WO2017/170283
PCT Pub. Date: Oct. 5, 2017

(65) Prior Publication Data
US 2019/0094492 A1    Mar. 28, 2019

(30) Foreign Application Priority Data

Mar. 28, 2016  (JP) ................................. 2016-064550

(51) Int. Cl.
| | |
|---|---|
| *G02B 9/60* | (2006.01) |
| *G02B 13/04* | (2006.01) |
| *G02B 7/02* | (2006.01) |
| *G02B 13/18* | (2006.01) |
| *G02B 13/00* | (2006.01) |
| *G02B 13/06* | (2006.01) |

(52) U.S. Cl.
CPC ............... *G02B 9/60* (2013.01); *G02B 7/021* (2013.01); *G02B 13/0045* (2013.01); *G02B 13/04* (2013.01); *G02B 13/06* (2013.01); *G02B 13/18* (2013.01)

(58) Field of Classification Search
None
See application file for complete search history.

(56) References Cited

U.S. PATENT DOCUMENTS

2017/0102520 A1 *   4/2017   Chen ........................ G02B 9/60
2017/0184818 A1 *   6/2017   Dai ......................... G02B 13/06

FOREIGN PATENT DOCUMENTS

| JP | 2007-199344 A | 8/2007 |
|---|---|---|
| JP | 2013-205715 A | 10/2013 |

OTHER PUBLICATIONS

International Search Report issued in corresponding International Application No. PCT/JP2017/012180 dated Jun. 20, 2017, with translation (3 pages).
Written Opinion of the International Searching Authority issued in corresponding International Application No. PCT/JP2017/012180 dated Jun. 20, 2017 (3 pages).

* cited by examiner

*Primary Examiner* — Darryl J Collins
(74) *Attorney, Agent, or Firm* — Osha Liang LLP

(57) ABSTRACT

A wide-angle optical system including, in order from an object side: a negative first lens that is a glass lens having a convex shape on the object side, a concave shape on an image side, and a spherical surface on either side; a negative second lens that has an aspherical surface on at least one side, and a concave shape on the image side; a positive third lens; an aperture; a fourth lens that has an aspherical surface on at least one side; and a fifth lens that has an aspherical surface on at least one side.

22 Claims, 4 Drawing Sheets

WIDE-ANGLE OPTICAL SYSTEM, LENS UNIT, AND IMAGING APPARATUS

TECHNICAL FIELD

The present invention relates to a wide-angle imaging optical system suitable for an on-vehicle camera or the like, a lens unit including the wide-angle optical system, and an imaging apparatus.

BACKGROUND

In recent years, imaging devices such as CMOSs and CCDs have become smaller in size and larger in the number of pixels, and imaging machines including such imaging devices have also become smaller in size. In this trend, imaging lenses to be mounted on these kinds of imaging machines are expected to have excellent optical performance while being small in size. Particularly, on-vehicle and surveillance cameras are expected to be small in size, have high performance, be inexpensive, and have a wide angle, and furthermore, emphasis tends to be put on high environment resistance for outdoor use.

Patent Literatures 1 and 2 disclose wide-angle imaging lenses that have power arrangement starting from negative, negative, and positive in this order from the object side, and these wide-angle imaging lenses are suggested as imaging lenses to be mounted on on-vehicle cameras. Patent Literature 1 suggests optimizing the joining surfaces of the last group, to obtain an imaging lens that is easy to manufacture and has high performance. However, such an imaging lens is hardly small enough for a sensor, and no environment resistance is taken into account. Patent Literature 2 also discloses a structure in which an elastic member is provided on the back surface of the first lens, with environment resistance being taken into account. In such a structure, however, load is applied to the first lens in the optical axis direction. As a result, the lens is lifted up, and performance such as the angle of view might vary. Although Patent Literature 2 discloses no numerical examples concerning optical shapes, it can be seen from the drawings that the total length relative to the sensor size is long, and the diameter relative to the sensor size is also long.

PATENT LITERATURES

Patent Literature 1: JP 2013-205715 A
Patent Literature 2: JP 2007-199344 A

SUMMARY

One or more embodiments provide a wide-angle imaging optical system that is small in size, has high performance, is inexpensive, and has a wide angle, while having an excellent environment resistance.

One or more embodiments aim to provide a lens unit and an imaging apparatus including the wide-angle optical system described above.

According to one or more embodiments, a wide-angle optical system includes, in the order from the object side: a negative first lens that is formed with a glass lens having a convex shape on the object side and a concave shape on the image side, and has a spherical surface on either side; a negative second lens that has an aspherical surface on at least one side and has a concave shape on the image side; a positive third lens; an aperture; a fourth lens that has an aspherical surface on at least one side; and a fifth lens that has an aspherical surface on at least one side,
wherein the following conditional expressions are satisfied, $$0.27 \leq D14/D1L \leq 0.37 \tag{1}$$

$$0.65 \leq D24/SAG2 \leq 0.85 \tag{2}$$

where

D14: the distance from the object-side surface of the first lens to the image-side surface of the second lens on the optical axis, D1L: the distance from the object-side surface of the first lens to the image-side surface of the fifth lens on the optical axis, D24: the distance from the image-side surface of the first lens to the image-side surface of the second lens on the optical axis, and SAG2: the SAG amount at the optical surface edge of the image-side surface of the first lens.

According to one or more embodiments, a lens unit includes: the above wide-angle optical system; and a lens holder that holds the wide angle optical system.

According to one or more embodiments, an imaging apparatus includes: the above lens unit; and an imaging device that projects an image formed by the lens unit.

DETAILED DESCRIPTION

Figure 1:
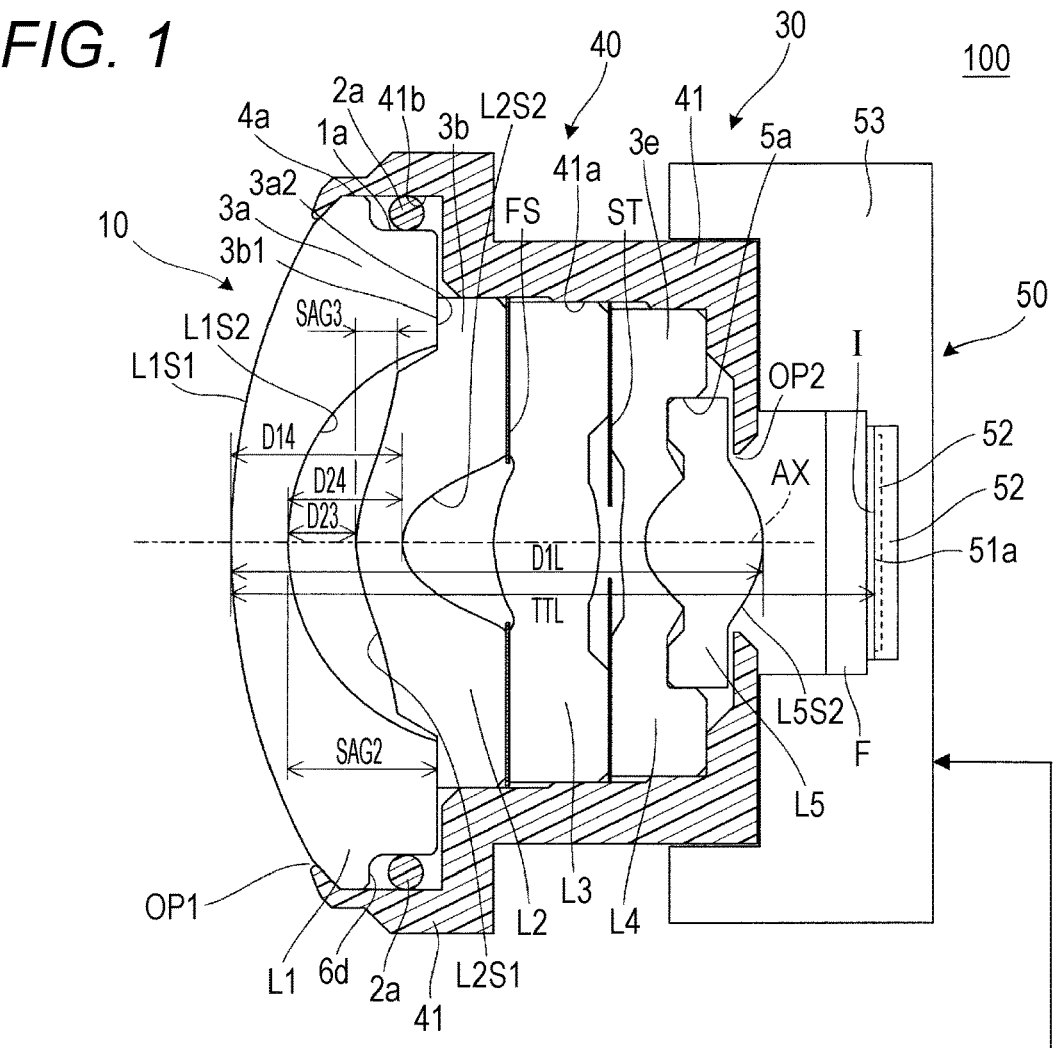
FIG. 1 is a diagram for explaining a lens unit including a wide-angle optical system, and an imaging apparatus according to one or more embodiments.
Figure 1:
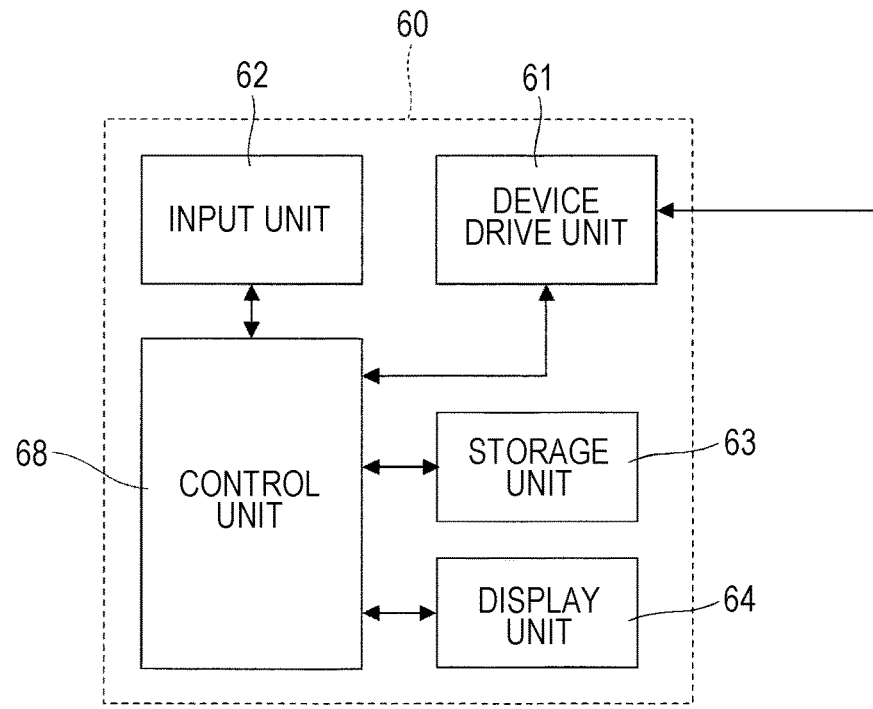

FIG. 1 is a cross-sectional view of an imaging apparatus 100 that is one or more embodiments of the present invention. The imaging apparatus 100 includes a camera module 30 for forming an image signal, and a processing unit 60 for causing the camera module 30 to operate so as to achieve the functions of the imaging apparatus 100.

The camera module 30 includes a lens unit 40 that has an imaging lens 10 installed therein, and a sensor unit 50 that converts an object image formed by the imaging lens 10 into an image signal.

The lens unit 40 includes the imaging lens 10 that is a wide-angle optical system, and a lens holder 41 having the imaging lens 10 incorporated thereinto. The imaging lens (wide-angle optical system) 10 is an ultrawide-angle lens or a fisheye lens, and is formed with five lenses L1 through L5 The lens holder 41 is made of resin or the like, and houses and holds the lenses and the like therein. The lens holder 41 has an opening OP1 for allowing light to enter from the object side, and an opening OP2 for allowing light to exit toward the image side.

The total angle of view of the imaging lens (wide-angle optical system) 10 is 160° or larger. The size of an optical system in the radial direction tends to become larger as the angle of view becomes larger. Therefore, in a case where the total angle of view is extremely large, such as 160° or larger, the size reducing effect and the like become particularly conspicuous in the imaging lens 10 having the lens configuration of one or more embodiments, as will be described later. The total angle of view of the imaging lens 10 is preferably 170° or larger.

Of the imaging lens (wide-angle optical system) 10, the first through fourth lenses L1 through L4 are in contact with the inner peripheral surface 41*a* of the lens holder 41 on the side surfaces (or the edges) of the flange parts or the outer peripheral parts thereof, and are positioned in a direction perpendicular to the optical axis AX. For example, the first lens L1 is in contact with the inner peripheral surface 41*b* of an enlarged portion of the diameter or the inner diameter of the lens holder 41 on the side surface 4*a* of the flange part (outer peripheral part) 3*a*. The first through fifth lenses L1 through L5 are housed in the lens holder 41 without any spacer. Specifically, the first through fifth lenses L1 through L5 are in contact only with the lenses in front of and behind them, an aperture stop ST, a flare stop FS, or the lens holder 41 at annular flange parts extending substantially perpendicularly to the optical axis AX, and are joined to one another with a joining material. Here, the inter-lens opposing surfaces of the first through fifth lenses L1 through L5 minus the object side of the first lens L1 and the image side of the fifth lens L5, which are the portions that determine the relative positions of the first through fifth lenses L1 through L5 in the direction of the optical axis AX, are formed in a region separate from the optical surface that is a curved surface. Specifically, the inter-lens opposing surface 3*a*2 on the image side of the flange part 3*a* of the first lens L1 is in contact only with the inter-lens opposing surface 3*b*1 on the image side of the flange part 3*b* of the second lens L2. Likewise, the opposing surface on the image side of the second lens L2 is in contact only with the flare stop FS. The opposing surface on the object side of the third lens L3 is in contact only with the flare stop FS, and the opposing surface on the image side of the third lens L3 is in contact only with the aperture stop ST. The opposing surface on the object side of the fourth lens L4 is in contact only with the aperture stop ST, and the opposing surface on the image side of the fourth lens L4 is in contact only with the opposing surface on the object side of the fifth lens L5. However, the fourth lens L4 and the fifth lens L5 are designed to be circumferentially engaged with each other by an outer engaging part 5*a* provided at the flange part 3*e* of the fourth lens L4. As such a structure in which the lenses are circumferentially engaged with each other is adopted, relative movement of the lenses L4 and L5 in a direction perpendicular to the optical axis AX is restricted.

As a structure in which the first through fifth lenses L1 through L5 are positioned by flange parts without any spacer is adopted as described above, it is possible not only to lower costs but also to reduce unnecessary assembly errors. Further, as a structure in which the fifth lens L5 is circumferentially engaged with the flange part 3*e* of the fourth lens L4 is adopted, the coaxiality between these lenses can be maintained, so that lens shift errors and collision between the optical surfaces can be avoided. The joint between the fourth lens L4 and the fifth lens L5 may cause a thickness error and a lens tilt error due to nonuniformity in the thickness of the joining material. However, a structure in which both the lenses L4 and L5 are brought into contact with each other by flanges is adopted, so that nonuniformity in the thickness of the joining material can be eliminated.

In the first lens L1 closest to the object among the lenses in the imaging lens 10, a step 6*d* is formed on a side surface 4*a* of the flange part 3*a*, and an annular space is formed between the first lens L1 and the lens holder 41. An elastic waterproof member 2*a* such as an O-ring can be inserted in the annular space, and this waterproof member 2*a* is interposed between a lower side surface part 1*a* of the side surface 4*a* of the flange part 3*a* and the inner peripheral surface 41*b* of the lens holder 41, to hermetically seal the inside of the lens holder 41. The waterproof member 2*a* can prevent the force along the optical axis AX from being applied to the first lens L1 and the like.

The sensor unit 50 includes: a solid-state imaging device 51 that performs photoelectric conversion on an object image formed by the imaging lens (wide-angle optical system) 10; a substrate 52 that supports the solid-state imaging device 51; and a sensor holder 53 that holds the solid-state imaging device 51 via the substrate 52. The solid-state imaging device 51 is a CMOS image sensor, for example. The substrate 52 includes wiring lines, peripheral circuits, and the like for operating the solid-state imaging device 51. The sensor holder 53 is formed with resin or some other material, and not only positions the solid-state imaging device 51 with respect to the optical axis AX, but also supports a filter F so as to face the solid-state imaging device 51. The sensor holder 53 is fixed in such a state so as to be positioned to engage with the lens holder 41 of the lens unit 40. In the example shown in the drawing, the lens unit 40 and the sensor unit 50 are integrally fixed. However, the present invention is not limited to this structure, and the lens unit 40 can be moved with respect to the sensor unit 50 so that focusing is enabled.

The solid-state imaging device (an imaging device) 51 includes a photoelectric converter 51*a* as an imaging surface I or a detection surface, and a signal processing circuit (not shown) is formed around the photoelectric converter 51*a*. In the photoelectric converter 51*a*, pixels, or photoelectric conversion elements, are two-dimensionally arranged. It should be noted that the solid-state imaging device 51 is not necessarily the above described CMOS image sensor, but may have another imaging device such as a CCD incorporated thereinto.

The processing unit 60 includes a device drive unit 61, an input unit 62, a storage unit 63, a display unit 64, and a control unit 68. The device drive unit 61 drives the solid-state imaging device 51 by outputting YUV and other digital pixel signals to an external circuit (specifically, a circuit or the like accompanying the solid-state imaging device 51), and receiving a supply of a voltage and a clock signal for driving the solid-state imaging device 51 from the control unit 68. The input unit 62 is a portion that receives a user operation. The storage unit 63 is a portion that stores information necessary for operation of the imaging apparatus 100, and image data and the like acquired by the camera module 30. The display unit 64 is a portion that displays information, a captured image, or the like to be presented to the user. The control unit 68 collectively controls operations of the device drive unit 61, the input unit 62, the storage unit 63, and the like. For example, the control unit 68 can perform various kinds of image processing on image data acquired through the camera module 30.

Although not described in detail herein, the specific functions of the processing unit 60 are adjusted as appropriate, in accordance with the purpose of use of the machine into which the imaging apparatus 100 is to be incorporated. The imaging apparatus 100 can be installed in apparatuses for various purposes of use, such as on-vehicle cameras and surveillance cameras.

Referring to FIG. 1, the imaging lens (wide-angle optical system) 10 and the like according to one or more embodiments are described below. It should be noted that the imaging lens 10 shown as an example in FIG. 1 has the same configuration as an imaging lens 11 of Example 1, which will be described later.

The imaging lens (wide-angle optical system) 10 shown in the drawing is a retrofocus-type optical system, and has a five-lens structure that has power arrangement starting from negative, negative, and positive in this order from the object side. More specifically, the imaging lens 10 includes, in the order from the object side: the first lens L1 that is negative, has a spherical surface, and is formed with glass having a convex shape on the object side and a concave shape on the image side; the second lens L2 that is negative and has a concave shape on the image side having an aspherical surface on at least one surface; the flare stop FS; the third lens L3 that is positive; the aperture stop ST; the fourth lens L4 that has an aspherical surface on at least one surface; and the fifth lens L5 that has an aspherical surface on at least one surface.

The first lens L1 disposed at a position exposed to the outside air is formed with glass to achieve a higher weather resistance. Further, the first lens L1 is formed as a glass lens with two side spherical surfaces that are easy to process, so that the imaging lens 10 can be made less expensive. The second through fifth lenses L2 through L5 are plastic or resin lenses. Because of this, the imaging lens 10 can be made lightweight and inexpensive. It should be noted that the second, fourth, and fifth lenses L2, L4, and L5 may be plastic or resin lenses, and the third lens L3 may be a glass lens. In the case of a fixed-focus optical system that does not perform automatic focusing (AF), defocusing is caused by a temperature change. Where the third lens L3 is a glass lens, however, defocusing can be more effectively prevented. It should be noted that, where the third lens L3 is a plastic lens, the defocusing is approximately +24 μm/+30° C., for example. Where the third lens L3 is a glass lens, the defocusing is approximately +2 μm/+30° C., for example.

The first lens L1 is a negative aspherical lens that has a convex object-side surface L1S1 and also has a meniscus shape paraxially convex on the object side. The second lens L2 is a negative aspherical lens that has a convex object-side surface L2S1 and also has a meniscus shape paraxially convex on the object side. The third lens L3 is a positive aspherical lens having a paraxially biconvex shape. The fourth lens L4 is a negative aspherical lens that has a convex object-side surface and a concave image-side surface, and also has a meniscus shape paraxially convex on the object side. The fifth lens L5 is a positive aspherical lens having a paraxially biconvex shape. Further, the fourth lens L4 and the fifth lens L5 are joined to each other. As the fourth and fifth lenses L4 and L5 are designed in this manner, chromatic aberration can be appropriately corrected.

As for the second lens L2, the maximum plane angle within the effective diameter of the image-side surface L2S2 is 60° or larger. Here, the plane angle of the image-side surface L2S2 is an angle formed by the normal line of the image-side surface L2S2 with the optical axis AX. Since the first lens L1 is made of glass, and there is a limit to the negative power that the first lens L1 can have due to restrictions on processing, the second lens L2 is made to have a great negative power so as to correct field curvature in a preferred manner in the entire system. Therefore, the maximum plane angle of the image-side surface L2S2 of the second lens L2 is preferably as large as above.

The imaging lens (wide-angle optical system) 10 satisfies the following conditional expressions (1) and (2).

$$0.27 \leq D14/D1L \leq 0.37 \quad (1)$$

$$0.65 \leq D24/SAG2 \leq 0.85 \quad (2)$$

Here, the value D14 represents the distance from the object-side surface L1S1 of the first lens L1 to the image-side surface L2S2 of the second lens L2 on the optical axis AX, the value D1 L represents the distance from the object-side surface L1S1 of the first lens L1 to the image-side surface L5S2 of the fifth lens L5 on the optical axis AX, the value D24 represents the distance from the image-side surface L1S2 of the first lens L1 to the image-side surface L2S2 of the second lens L2 on the optical axis AX, and the value SAG2 is the SAG amount at the optical surface edge of the image-side surface L1S2 of the first lens L1.

The imaging lens (wide-angle optical system) 10 is a five-lens structure having power arrangement starting from negative, negative, and positive in the order from the object side. As both of the expressions (1) and (2) are satisfied in the imaging lens (wide-angle optical system) 10 that uses a glass spherical lens as the first lens L1 in such a structure formed with only five lenses, it is possible to obtain an inexpensive and compact imaging system having a waterproof mechanism that hardly affects optical performance, while maintaining an appropriate back focal distance and performing preferable field curvature correction. Specifically, since the value D14/D1 L in the expression (1) is equal to or smaller than the upper limit, it is possible to maintain an appropriate back focal distance or shorten the total optical length. Thus, it is possible to reduce the size. Further, as the value D14/D1 L is equal to or greater than the lower limit in the expression (1), the first lens L1 and the like do not become too thin. As the value D24/SAG2 in the expression (2) is equal to or smaller than the upper limit, it is possible to thicken the flange part 3*a* or the outer peripheral part of the first lens L1 while reducing the size in the radial direction. Thus, the space into which the waterproof member 2*a* such as an O-ring is to be inserted can be secured in the flange part 3*a* or the outer peripheral part of the first lens L1. Also, as the value D24/SAG2 is equal to or greater than the lower limit in the expression (2), it is possible to prevent the second lens L2 from excessively entering the first lens L1, and maintain a sufficient effective diameter for the object-side surface L2S1 of the second lens L2. Thus, it is possible to easily correct the field curvature, easily achieve a peripheral light amount ratio, and maintain sufficient performance even though the total optical length is short. It should be noted that an optical surface means a region where a spherical surface or an aspheric surface exists, and an optical surface edge means the outer edge of the region where a spherical surface or an aspherical surface exists and does not necessarily mean the peripheral edge of the effective diameter.

Further, the imaging lens (wide-angle optical system) 10 further satisfies the following conditional expression (3).

$$4.0 \leq TTL/H\max \leq 5.5 \quad (3)$$

Here, the value TTL is the total optical length, and the value Hmax is the maximum image height. As for the value Hmax, the maximum image height corresponds to half the diagonal length of the detection surface or the imaging surface I of the solid-state imaging device 51. As the total optical length relative to the size of the solid-state imaging device 51 is kept within the range according to the above expression (3), it is possible to reduce the height while maintaining optical performance. It should be noted that the value TTL/Hmax in the above expression (3) is made equal to or smaller than the upper limit so that the height can be advantageously reduced, and is made equal to or smaller than the lower limit in the expression (3) so that optical performance degradation can be reduced.

The imaging lens (wide-angle optical system) 10 further satisfies the following conditional expression (4).

$$4.0 \leq \phi1/Hmax \leq 5.5 \qquad (4)$$

Here, the value φ1 represents the optical surface diameter of the object-side surface L1S1 of the first lens L1. As for the value φ1, the optical surface diameter means the diameter of a region where a spherical surface or an aspherical surface exists. As the optical surface diameter of the object-side surface L1S1 of the first lens L1 relative to the size of the solid-state imaging device 51 is kept within the range according to the above expression (4), it is possible to reduce the size in the radial direction while maintaining optical performance. It should be noted that the value φ1/Hmax in the above expression (4) is made equal to or smaller than the upper limit so that an increase in the outer diameter can be prevented, and thus, the size in the radial direction can be advantageously reduced. The value φ1/Hmax is made equal to or greater than the lower limit according to the above expression (4) so that optical performance degradation can be reduced.

The imaging lens (wide-angle optical system) 10 further satisfies the following conditional expression (5).

$$0.65 \leq (D23+SAG3)/SAG2 \leq 1.0 \qquad (5)$$

Here, the value D23 represents the distance from the image-side surface L1S2 of the first lens L1 to the object-side surface L2S1 of the second lens L2 on the optical axis AX, the value SAG2 represents the SAG amount at the optical surface edge of the image-side surface L1S2 of the first lens L1, and the value SAG3 represents the SAG amount at the optical surface edge of the object-side surface L2S1 of the second lens L2. As the above expression (5) is satisfied, a reduction in size in the radial direction and high performance can be achieved at the same time. It should be noted that the value (D23+SAG3)/SAG2 in the above expression (5) is made equal to or greater than the lower limit, it is possible to prevent the effective diameter of the object-side surface L2S1 of the second lens L2 from becoming too short, and thus, aberration correction becomes easier. Further, as the value (D23+SAG3)/SAG2 is made equal to or smaller than the upper limit according to the expression (5), it becomes unnecessary to assume a structure in which a light shielding member or the like is inserted between the first and second lenses L1 and L2. Thus, a certain degree of freedom is maintained for the surface shape of the object-side surface L2S1 of the second lens L2, and aberration correction becomes easier.

The imaging lens (wide-angle optical system) 10 further satisfies the following conditional expressions (6) and (7).

$$3.0 \leq R1/R2 \leq 3.5 \qquad (6)$$

$$1.85 \leq \phi2/R2 \leq 1.95 \qquad (7)$$

Here, the value R1 represents the radius of curvature of the object-side surface L1S1 of the first lens L1, the value R2 represents the radius of curvature of the image-side surface L1S2 of the first lens L1, and the value φ2 represents the optical surface diameter of the image-side surface L1S2 of the first lens L1. As the above expressions (6) and (7) are satisfied, the curvature difference between the object-side surface L1S1 of the first lens L1 and the image-side surface L1S2 of the first lens L1 is sufficiently large, and the image-side surface L1S2 of the first lens L1 is deep. Accordingly, it is possible to maintain a sufficient thickness for the side surfaces or the edges of the first lens L1. Thus, a sealing means such as an O-ring can be easily inserted into the outer peripheral part or the flange part of the first lens L1, and a structure with an excellent environment resistance can be obtained. It should be noted that, as the value R1/R2 in the above expression (6) is made equal to or greater than the lower limit, it is possible to prevent increase in the outer diameter and achieve a reduction in size, while the curvature difference is prevented from becoming smaller and thick edges are maintained. Further, the value R1/R2 is made equal to or smaller than the upper limit according to the above expression (6), and the value φ2/R2 in the above expression (7) is made equal to or greater than the lower limit. In this manner, it is possible to correct field curvature in a preferred manner. As the value φ2/R2 is made equal to or smaller than the upper limit according to the above expression (7), it is possible to prevent the polishing of the spherical glass surface from approaching the processing limit, and avoid insufficient precision and cost increase.

The imaging lens (wide-angle optical system) 10 further satisfies the following conditional expression (8).

$$0.8 \leq D12/f \leq 1.2 \qquad (8)$$

Here, the value D12 represents the distance from the object-side surface L1S1 to the image-side surface L1S2 of the first lens L1 on the optical axis AX, or the center thickness of the first lens L1, and the value f represents the focal length of the entire system, which is the imaging lens 10. As the center thickness of the first lens L1 that is made of glass satisfies the above expression (8), it is possible to achieve preferred negative power while maintaining processability. It should be noted that, as the value D12/f in the above expression (8) is made equal to or smaller than the upper limit, it is possible to prevent the core thickness from becoming too thick and avoid failing to achieve suitable negative power. Thus, it is possible to prevent deterioration of the processability of the first lens L1 that is to be formed through glass polishing and the like. Also, as the value D12/f is made equal to or greater than the lower limit according to the above expression (8), it is possible to reduce the possibility that the lens cracks due to impact or the like because the core thickness becomes too thin.

The imaging lens (wide-angle optical system) 10 further satisfies the following conditional expression (9).

$$-0.6 \leq f12/f345 \leq -0.4 \qquad (9)$$

Here, the value f12 is the combined focal length of the first and second lenses L1 and L2, and the value f345 is the combined focal length of the third through fifth lenses L3 through L5. In this case, the retrofocus is moderate, and accordingly, the back focal distance does not become too long, which is advantageous in reducing the total optical length.

The imaging lens (wide-angle optical system) 10 further satisfies the following conditional expression (10).

$$0.20 \leq \phi4/\phi1 \leq 0.34 \qquad (10)$$

Here, the value φ4 represents the optical surface diameter of the image-side surface L2S2 of the second lens L2, and the value φ1 represents the optical surface diameter of the object-side surface L1S1 of the first lens L1. As the luminous flux diameter is made sufficiently small on the front side of the optical system, it is possible to obtain a structure in which ghosting hardly occurs even if any light shielding member is not provided between the first lens L1 and the second lens L2, for example. In an optical system in which the value ϕ4/ϕ1 in the above expression (10) is equal to or smaller than the upper limit, the luminous flux diameter becomes relatively short on the front side of the optical system, and thus, the possibility of ghosting can be reduced. Further, in an optical system in which the value ϕ4/ϕ1 is equal to or greater than the lower limit according to the expression (10), the angle of the lens surface or the optical surface does not become too large, and thus, degradation of processability and formability can be avoided. More preferably, the imaging lens 10 satisfies the following conditional expression (10)'.

$$0.25 \leq \phi 4/\phi 1 \leq 0.30 \quad (10)'$$

It should be noted that, in addition to the above described lenses L1 through L5, the imaging lens (wide-angle optical system) 10 may further include other optical elements (such as lenses and filter members) having substantially no power.

The lens unit described so far includes the above imaging lens (wide-angle optical system) 10, which is small in size, has high performance, and as a wide angle, while having an excellent environment resistance. Further, the imaging apparatus 100 including the lens unit 40 can form a high-performance apparatus that has an excellent environment resistance.

EXAMPLES

Specific examples of the wide-angle optical system of one or more embodiments of the present invention will be described below. The symbols used in each example are as follows. The unit for length is mm.
f: Focal length of the entire system of the wide-angle optical system
Fno: F value
2w: Total angle of view
R: Radius of curvature
D: Axial surface distance
nd: Refractive index of the lens material with respect to d line
vd: Abbe number of the lens material Example 1

The basic initial optical values of a wide-angle optical system of Example 1 are shown below.
f=1.00
Fno=2.0
2w=190°

The data of the optical surfaces, or the lens surfaces, of Example 1 is shown below in Table 1. In Table 1 and other tables, the surface numbers are shown in the column "Surface", and infinity is represented by "INF". As for the surface numbers, the lens surfaces are represented by "L1S1" and the like, the object surface is represented by "OBJ", the aperture stop ST is represented by "STOP", the object-side surface of the parallel plate is represented by "CGS1" and the image-side surface of the parallel plate Is represented by "CGS2". In the notation of a lens surface, the symbol Ln (n=1 through 5) of the first half represents the nth lens (specifically, the first through fifth lenses). As for the second half, the symbol S1 represents the object-side surface of the nth lens, and the symbol S2 represents the image-side surface of the nth lens. The value D of an axial surface distance means the distance from the surface in the field to the surface in the lower left field. Specifically, the value D on the right side of the image-side surface "CGS2" of the parallel plate indicates the axial surface distance from the image-side surface to the imaging surface I (or the imaging plane) of the parallel plate.

TABLE 1

| Surface | R | D | nd | vd |
|---|---|---|---|---|
| OBJ | INF | INF | | |
| L1S1 | 11.9000 | 1.000 | 1.8042 | 46.5 |
| L1S2 | 3.6900 | 1.237 | | |
| L2S1 | 2.5301 | 0.806 | 1.5351 | 56.0 |
| L2S2 | 0.6911 | 1.645 | | |
| L3S1 | 2.7189 | 1.868 | 1.6347 | 23.7 |
| L3S2 | −2.7284 | 0.168 | | |
| STOP | INF | 0.204 | | |
| L4S1 | 10.4310 | 0.422 | 1.6347 | 23.7 |
| L4S2 | 1.6931 | 0.015 | 1.5140 | 42.8 |
| L5S1 | 1.6931 | 2.098 | 1.5351 | 56.0 |
| L5S2 | −1.5364 | 1.158 | | |
| CGS1 | INF | 0.700 | 1.5168 | 64.1 |
| CGS2 | INF | 0.150 | | |

The aspherical coefficients of the lens surfaces of Example 1 are shown below in Table 2. The shape of an aspherical surface is expressed by the following expression, with the vertex of the surface being the origin, the X-axis being the optical axis direction, h representing the height in a direction perpendicular to the optical axis.

$$X = \frac{h^2/R}{1 + \sqrt{1 - (1+K)h^2/R^2}} + \Sigma A_i h^i$$

In the expression,
Ai: ith-order aspherical coefficient
R: Radius of curvature
K: Conical constant

TABLE 2

| L2S1 surface |
|---|
| K = −6.6386E−01, A4 = −2.3341E−02, A6 = −1.1318E−05, A8 = 2.3004E−04, A10 = −2.3118E−05, A12 = 7.6550E−07 |
| L2S2 surface |
| K = −1.6744E+00, A4 = 2.7670E−01, A6 = −1.0869E−01, A8 = 2.6885E−02, A10 = 5.6580E−03, A12 = −3.7341E−03 |
| L3S1 surface |
| K = −1.1611E+01, A4 = 7.5016E−02, A6 = −3.4005E−02, A8 = 1.8369E−02, A10 = −7.2239E−03, A12 = 1.8623E−08 |
| L3S2 surface |
| K = −2.7266E+01, A4 = −4.2468E−02, A6 = −4.0880E−03, A8 = 3.5047E−03, A10 = −6.1412E−04, A12 = 1.0703E−07 |
| L4S1 surface |
| K = −3.8674E+01, A4 = 1.3640E−01, A6 = 1.0469E−01, A8 = −1.2562E+00, A10 = 2.1564E+00, A12 = −1.1897E+00 |
| L4S2 surface |
| K = 3.0722E−01, A4 = 1.0364E+00, A6 = −1.6201E+00, A8 = 1.0653E+00, A10 = −2.7874E−01, A12 = −3.1274E−04 |
| L5S1 surface |
| K = 3.0722E−01, A4 = 1.0364E+00, A6 = −1.6201E+00, A8 = 1.0653E+00, A10 = −2.7874E−01, A12 = −3.1274E−04 |

TABLE 2-continued

L5S2 surface

K = −9.4546E+00, A4 = −1.8172E−01, A6 = 1.3415E−01,
A8 = −6.1393E−02, A10 = 1.2367E−02, A12 = 3.6185E−06

In Table 2 shown above and the tables shown below, a power of 10 ($2.5 \times 10^{-02}$, for example) is expressed with E (2.5E−02, for example).

The characteristic values related to the conditional expressions (1) through (10) of Example 1 are shown below in Table 3.

TABLE 3

| | |
|---|---|
| f | 1.00 |
| f12 | −1.34 |
| f345 | 2.64 |
| Hmax | 2.45 |
| D14 | 3.04 |
| D12 | 1.00 |
| D23 | 1.24 |
| D24 | 2.04 |
| D1L | 9.46 |
| TTL | 11.47 |
| φ1 | 11.40 |
| φ2 | 7.09 |
| φ4 | 3.07 |
| SAG2 | 2.67 |
| SAG3 | 0.72 |
| R1 | 11.90 |
| R2 | 3.69 |

Figure 2:
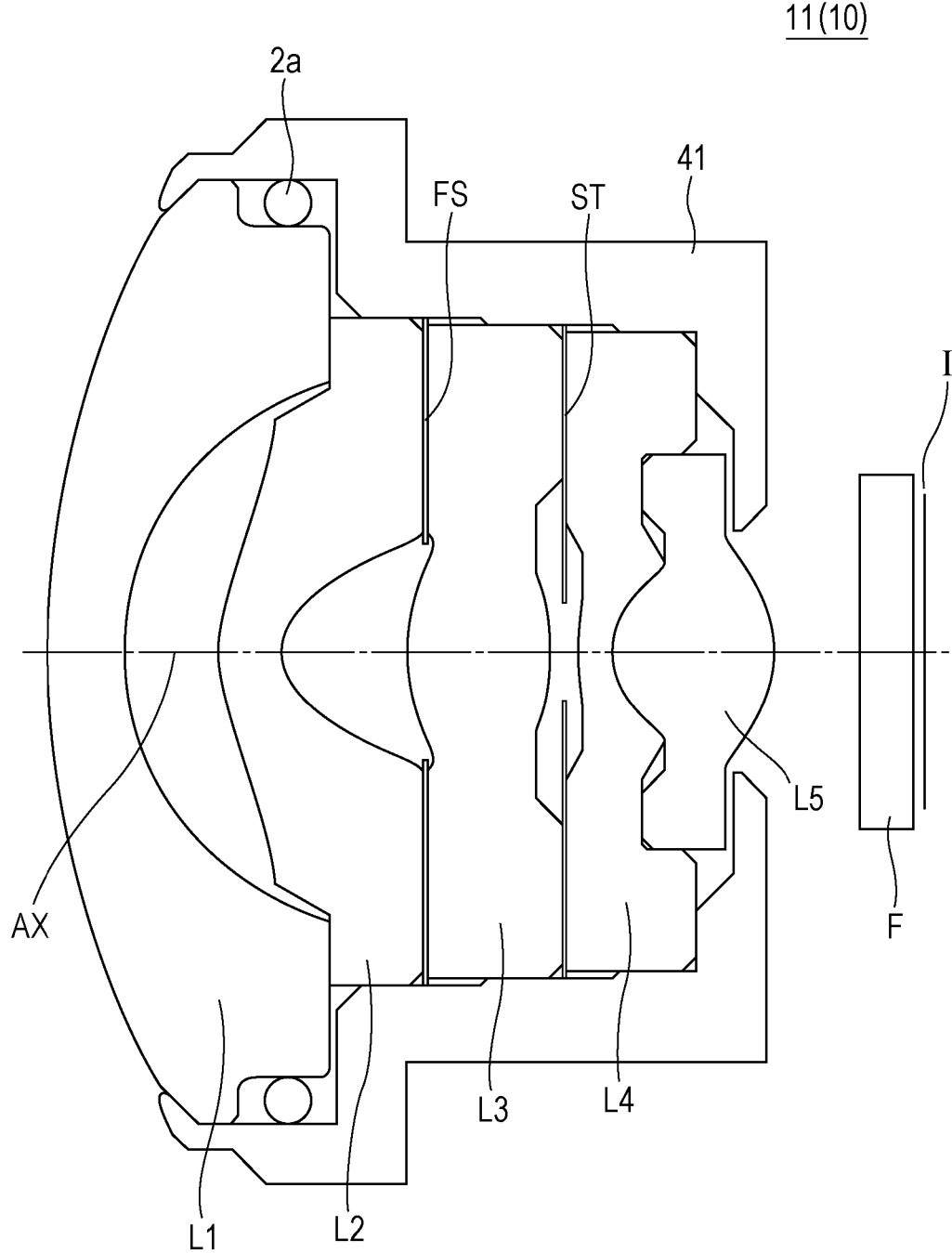
FIG. 2 is a cross-sectional view of an imaging lens or the like of Example 1.

FIG. 2 is a cross-sectional view of an imaging lens 11 or the like that is the wide-angle optical system of Example 1. The imaging lens 11 includes a first lens L1 as a negative meniscus lens that is convex on the object side, a second lens L2 as a negative meniscus lens that is convex on the object side, a third lens L3 as a positive biconvex lens, a fourth lens L4 as a negative meniscus lens that is convex on the object side, and a fifth lens L5 as a positive biconvex lens. A flare stop FS is provided between the second lens L2 and the third lens L3, and an aperture stop ST is provided between the third lens L3 and the fourth lens L4. It should be noted that, on the image side of the fifth lens L5, the imaging surface I is provided via a filter F which is a parallel plate.

Example 2

The basic initial optical values of a wide-angle optical system of Example 2 are shown below.
f=1.03
Fno=2.06
2w=186°

The data of the optical surfaces, or the lens surfaces, of Example 2 is shown below in Table 4.

TABLE 4

| Surface | R | D | nd | vd |
|---|---|---|---|---|
| OBJ | INF | INF | | |
| L1S1 | 12.4307 | 1.200 | 1.8042 | 46.5 |
| L1S2 | 3.6209 | 1.528 | | |
| L2S1 | 2.5279 | 0.700 | 1.5351 | 56.0 |
| L2S2 | 0.7235 | 1.599 | | |
| L3S1 | 3.0569 | 2.023 | 1.6347 | 23.7 |
| L3S2 | −2.8597 | 0.266 | | |
| STOP | INF | 0.203 | | |
| L4S1 | 8.0470 | 0.400 | 1.6347 | 23.7 |
| L4S2 | 1.2667 | 0.010 | 1.5140 | 42.8 |

TABLE 4-continued

| Surface | R | D | nd | vd |
|---|---|---|---|---|
| L5S1 | 1.2667 | 1.937 | 1.5351 | 56.0 |
| L5S2 | −1.6446 | 0.235 | | |
| CGS1 | INF | 0.700 | 1.5168 | 64.1 |
| CGS2 | INF | 1.332 | | |

The aspherical coefficients of the lens surfaces of Example 2 are shown below in Table 5.

TABLE 5

L2S1 surface

K = −6.1436E−01, A4 = −2.2597E−02, A6 = −1.1960E−04,
A8 = 2.3215E−04, A10 = −2.5160E−05, A12 = 9.7645E−07

L2S2 surface

K = −1.6201E+00, A4 = 2.5915E−01, A6 = −1.0250E−01,
A8 = 2.8110E−02, A10 = 4.0820E−03, A12 = −3.5570E−03

L3S1 surface

K = −1.5161E+01, A4 = 6.8443E−02, A6 = −3.9483E−02,
A8 = 2.3069E−02, A10 = −8.1684E−03, A12 = 1.8623E−08

L3S2 surface

K = −1.8082E+01, A4 = −3.5104E−02, A6 = −1.6265E−02,
A8 = 1.0817E−02, A10 = −1.9445E−03, A12 = 1.0703E−07

L4S1 surface

K = −4.0000E+01, A4 = 7.4143E−02, A6 = 1.0516E−01,
A8 = −1.0603E+00, A10 = 1.9489E+00, A12 = −1.1897E+00

L4S2 surface

K = −5.3270E+00, A4 = 9.7699E−01, A6 = −1.3880E+00,
A8 = 9.3363E−01, A10 = −2.5616E−01, A12 = −3.1274E−04

L5S1 surface

K = −5.3270E+00, A4 = 9.7699E−01, A6 = −1.3880E+00,
A8 = 9.3363E−01, A10 = −2.5616E−01, A12 = −3.1274E−04

L5S2 surface

K = −1.0019E+01, A4 = −1.8729E−01, A6 = 1.3938E−01,
A8 = −6.7634E−02, A10 = 1.4010E−02, A12 = 3.6185E−06

The characteristic values related to the conditional expressions (1) through (10) of Example 2 are shown below in Table 6.

TABLE 6

| | |
|---|---|
| f | 1.03 |
| f12 | −1.35 |
| f345 | 2.66 |
| Hmax | 2.36 |
| D14 | 3.43 |
| D12 | 1.20 |
| D23 | 1.53 |
| D24 | 2.23 |
| D1L | 9.87 |
| TTL | 12.13 |
| φ1 | 11.40 |
| φ2 | 7.05 |
| φ4 | 2.95 |
| SAG2 | 2.79 |
| SAG3 | 0.78 |
| R1 | 12.43 |
| R2 | 3.62 |

Figure 3:
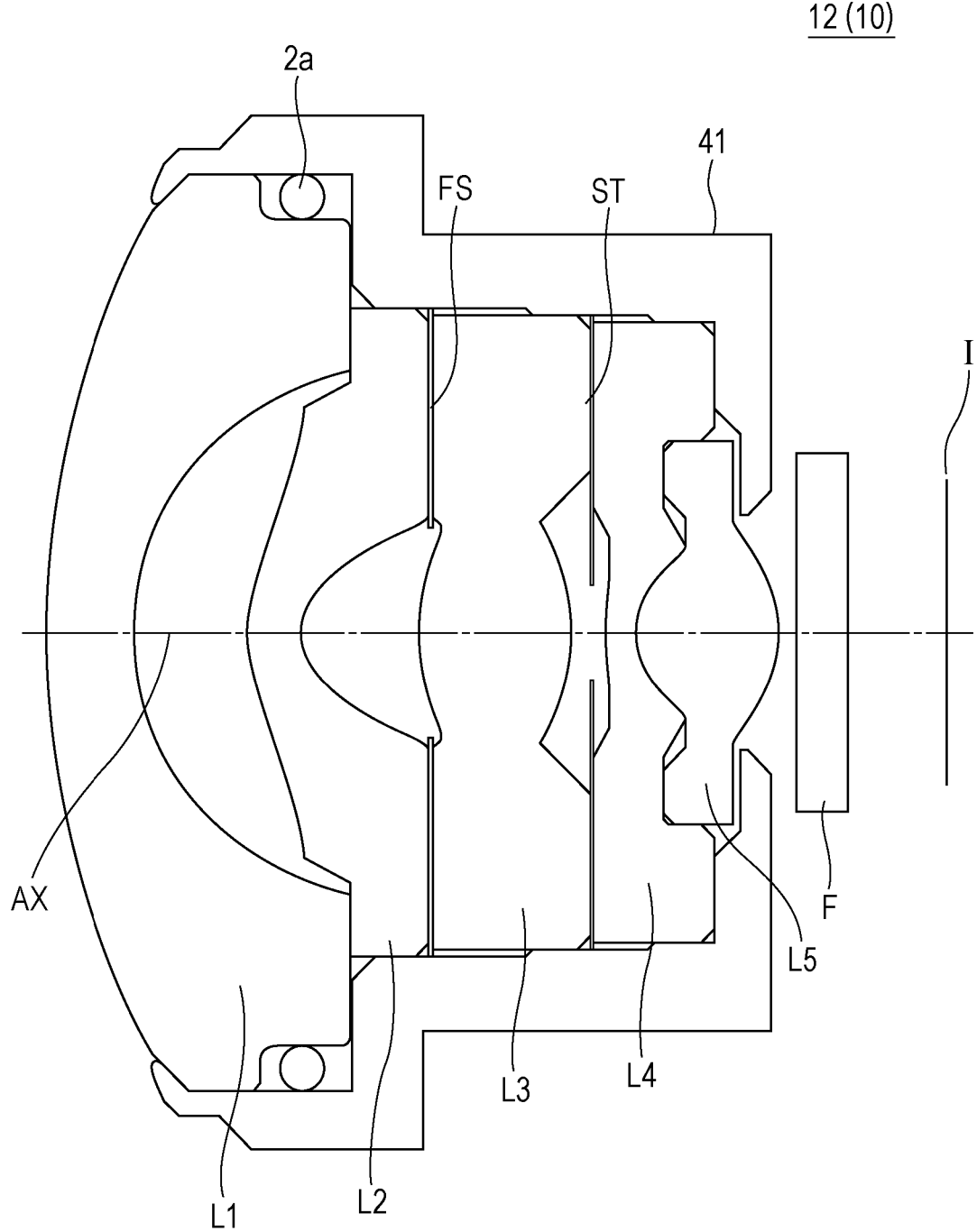
FIG. 3 is a cross-sectional view of an imaging lens or the like of Example 2.

FIG. 3 is a cross-sectional view of an imaging lens 12 or the like that is the wide-angle optical system of Example 2. The imaging lens 12 includes a first lens L1 as a negative meniscus lens that is convex on the object side, a second lens L2 as a negative meniscus lens that is convex on the object side, a third lens L3 as a positive biconvex lens, a fourth lens L4 as a negative meniscus lens that is convex on the object side, and a fifth lens L5 as a positive biconvex lens. A flare stop FS is provided between the second lens L2 and the third lens L3, and an aperture stop ST is provided between the third lens L3 and the fourth lens L4. It should be noted that, on the image side of the fifth lens L5, the imaging surface I is provided via a filter F which is a parallel plate.

In Table 7 shown below, the values in the respective conditional expressions (1) through (10) in Examples 1 and 2 are summarized for reference.

TABLE 7

| Conditional expression | Value in conditional expression | Example 1 | Example 2 |
|---|---|---|---|
| (1) | D14/D1L | 0.32 | 0.35 |
| (2) | D24/SAG2 | 0.77 | 0.80 |
| (3) | TTL/Hmax | 4.69 | 5.14 |
| (4) | φ1/Hmax | 4.66 | 4.83 |
| (5) | (D23 + SAG3)/SAG2 | 0.73 | 0.83 |
| (6) | R1/R2 | 3.22 | 3.43 |
| (7) | φ2/R2 | 1.92 | 1.95 |
| (8) | D12/f | 1.00 | 1.16 |
| (9) | f12/f345 | −0.51 | −0.51 |
| (10) | φ4/φ1 | 0.27 | 0.26 |

A wide-angle optical system and the like according to one or more embodiments are now described. The wide-angle optical system according to one or more embodiments is a modification of the wide-angle optical system, and the aspects that are not particularly described herein are the same as those described above.

Figure 4:
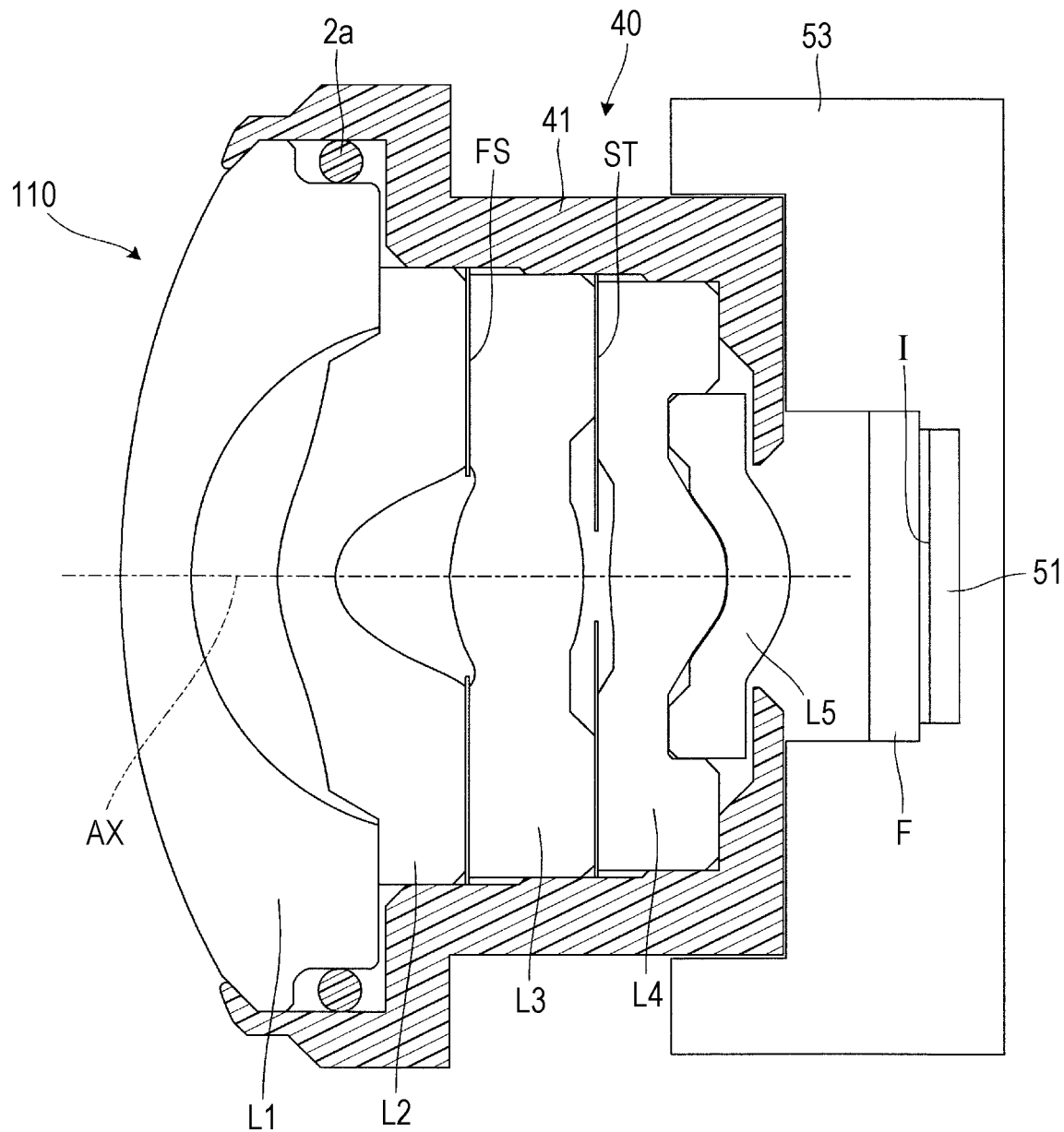
FIG. 4 is a diagram for explaining a lens unit or the like including a wide-angle optical system according to one or more embodiments.

FIG. 4 shows a lens unit 40 or the like that includes an imaging lens 110 that is the wide-angle optical system of one or more embodiments. In this case, the fourth lens L4 is a positive aspherical lens having a paraxial biconvex shape, and the fifth lens L5 is a negative aspherical lens that has a concave object-side surface and has a meniscus shape that is paraxially convex on the image side. Designing the fourth and fifth lenses L4 and L5 in this manner is advantageous in performing chromatic aberration correction. The fourth lens L4 and the fifth lens L5 may be designed such that they are joined to each other.

Although wide-angle optical systems according to one or more embodiments have been described so far, wide-angle optical systems according to the present invention are not limited to the above embodiments, and various modifications may be made to them.

Although the disclosure has been described with respect to only a limited number of embodiments, those skilled in the art, having benefit of this disclosure, will appreciate that various other embodiments may be devised without departing from the scope of the claimed invention. Accordingly, the scope of the invention should be limited only by the attached claims.

The invention claimed is:

1. A wide-angle optical system comprising, in order from an object side:
 a negative first lens that is a glass lens having:
  a convex shape on the object side,
  a concave shape on an image side, and
  a spherical surface on either side;
 a negative second lens that has:
  an aspherical surface on at least one side, and
  a concave shape on the image side;
 a positive third lens;
 an aperture;
 a fourth lens that has an aspherical surface on at least one side; and
 a fifth lens that has an aspherical surface on at least one side,
 wherein conditional expressions (1) and (2) are satisfied, $$0.27 \leq D14/D1L \leq 0.37 \quad (1)$$

$$0.65 \leq D24/SAG2 \leq 0.85 \quad (2)$$

where
 D14: a distance from an object-side surface of the first lens to an image-side surface of the second lens on an optical axis,
 D1L: a distance from the object-side surface of the first lens to an image-side surface of the fifth lens on the optical axis,
 D24: a distance from an image-side surface of the first lens to the image-side surface of the second lens on the optical axis, and
 SAG2: a SAG amount at an optical surface edge of the image-side surface of the first lens.

2. The wide-angle optical system according to claim 1, wherein conditional expression (3) is satisfied, $$4.0 \leq TTL/Hmax \leq 5.5 \quad (3)$$

where
 TTL: a total optical length, and
 Hmax: a maximum image height.

3. The wide-angle optical system according to claim 1, wherein conditional expression (4) is satisfied, $$4.0 \leq \phi1/Hmax \leq 5.5 \quad (4)$$

where
 φ1: an optical surface diameter of the object-side surface of the first lens, and
 Hmax: the maximum image height.

4. The wide-angle optical system according to claim 1, wherein conditional expression (5) is satisfied, $$0.65 \leq (D23+SAG3)/SAG2 \leq 1.0 \quad (5)$$

where
 D23: a distance from the image-side surface of the first lens to an object-side surface of
  the second lens on the optical axis,
 SAG2: the SAG amount at the optical surface edge of the image-side surface of the
  first lens, and
 SAG3: a SAG amount at an optical surface edge of the object-side surface of the second lens.

5. The wide-angle optical system according to claim 1, wherein conditional expressions (6) and (7) are satisfied, $$3.0 \leq R1/R2 \leq 3.5 \quad (6)$$

$$1.85 \leq \phi2/R2 \leq 1.95 \quad (7)$$

where
- R1: a radius of curvature of the object-side surface of the first lens,
- R2: a radius of curvature of the image-side surface of the first lens, and
- φ2: an optical surface diameter of the image-side surface of the first lens.

6. The wide-angle optical system according to claim 1, wherein conditional expression (8) is satisfied, $$0.8 \leq D12/f \leq 1.2 \quad (8)$$

where
- D12: a center thickness of the first lens, and
- f: a focal length of the entire system.

7. The wide-angle optical system according to claim 1, wherein a maximum plane angle within an effective diameter of the image-side surface of the second lens is at least 60 degrees.

8. The wide-angle optical system according to claim 1, wherein conditional expression (9) is satisfied, $$-0.6 \leq f12/f345 \leq -0.4 \quad (9)$$

where
- f12: a combined focal length of the first and second lenses, and
- f345: a combined focal length of the third through fifth lenses.

9. The wide-angle optical system according to claim 1, wherein a total angle of view is 160 degrees.

10. The wide-angle optical system according to claim 1, wherein the second through fifth lenses are plastic lenses.

11. The wide-angle optical system according to claim 1, wherein the second, fourth, and fifth lenses are plastic lenses, and the third lens is a glass lens.

12. The wide-angle optical system according to claim 1, wherein the object-side surface of the second lens has a convex shape.

13. The wide-angle optical system according to claim 1, wherein the third lens has a biconvex shape having an aspherical surface on at least one side of the third lens.

14. The wide-angle optical system according to claim 1, wherein:
- the fourth lens is a negative lens having a concave shape on the image side,
- the fifth lens is a positive lens having a biconvex shape, and
- the fourth and fifth lenses are joined.

15. The wide-angle optical system according to claim 1, wherein:
- the fourth lens is a positive lens having a biconvex shape, and
- the fifth lens is a negative meniscus lens having a concave shape on the object side.

16. The wide-angle optical system according to claim 15, wherein the fourth and fifth lenses are joined.

17. The wide-angle optical system according to claim 1, wherein the fifth lens is circumferentially engaged with a flange part of the fourth lens.

18. The wide-angle optical system according to claim 1, wherein inter-lens opposing surfaces except for the object side of the first lens and the image side of the fifth lens are:
- formed in a region separate from optical surfaces, and
- in contact only with front and rear lenses, the aperture, or a lens holder at a flange part perpendicular to the optical axis.

19. The wide-angle optical system according to claim 1, wherein conditional expression (10) is satisfied, $$0.20 \leq \phi4/\phi1 \leq 0.34 \quad (10)$$

where
- φ4: an optical surface diameter of the image-side surface of the second lens, and
- φ1: the optical surface diameter of the object-side surface of the first lens.

20. A lens unit comprising:
- the wide-angle optical system according to claim 1; and
- a lens holder that holds the wide-angle optical system.

21. The lens unit according to claim 20, further comprising a waterproof member interposed between a side surface of a flange part of the first lens and an inner peripheral surface of the lens holder.

22. An imaging apparatus comprising:
- the lens unit according to claim 20; and
- an imaging device that projects an image formed by the lens unit.

* * * * *